UNITED STATES PATENT OFFICE.

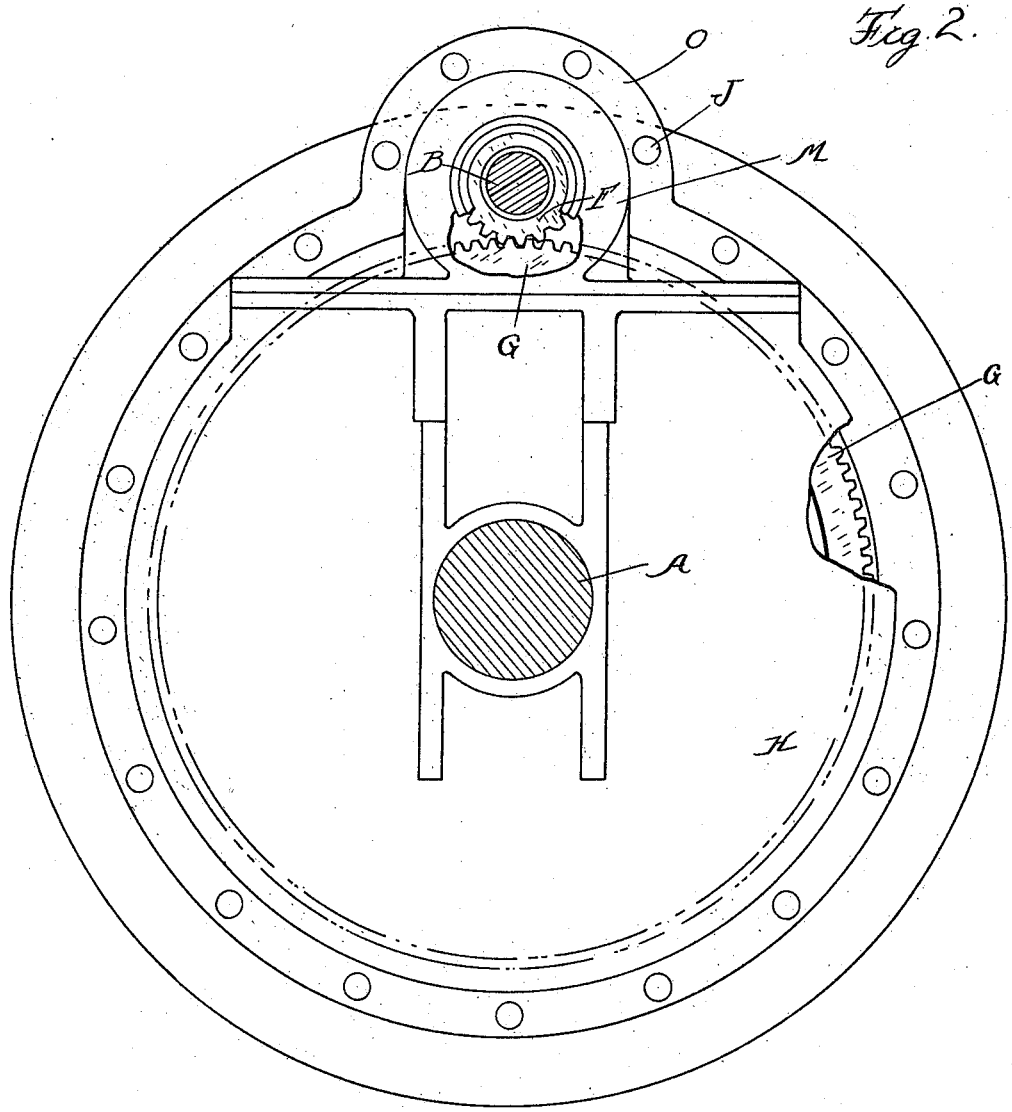

ALANSON P. BRUSH, OF DETROIT, MICHIGAN.

VEHICLE DRIVE-AXLE.

1,401,580.   Specification of Letters Patent.   Patented Dec. 27, 1921.

Application filed March 8, 1917. Serial No. 153,519.

*To all whom it may concern:*

Be it known that I, ALANSON P. BRUSH, a citizen of the United States of America, residing at Detroit, in the county of Wayne and State of Michigan, have invented certain new and useful Improvements in Vehicle Drive-Axles, of which the following is a specification, reference being had therein to the accompanying drawings.

The invention relates to vehicle drive axles of that type in which the wheels are driven from a jack-shaft through the medium of intermeshing gears or other transmission. It is one of the objects of the invention to obtain a construction which permits of removing the wheel without the driving gear therefor, thereby avoiding the necessity of opening the gear housing or draining off the lubricant therefrom. It is a further object to centrally support the gear in the plane of the teeth thereof; further to provide for the independent removal of the jack-shaft; and still further, to obtain various advantages of construction as hereinafter set forth.

In the drawings:

Fig. 2 is an end elevation thereof.

Figure 1:
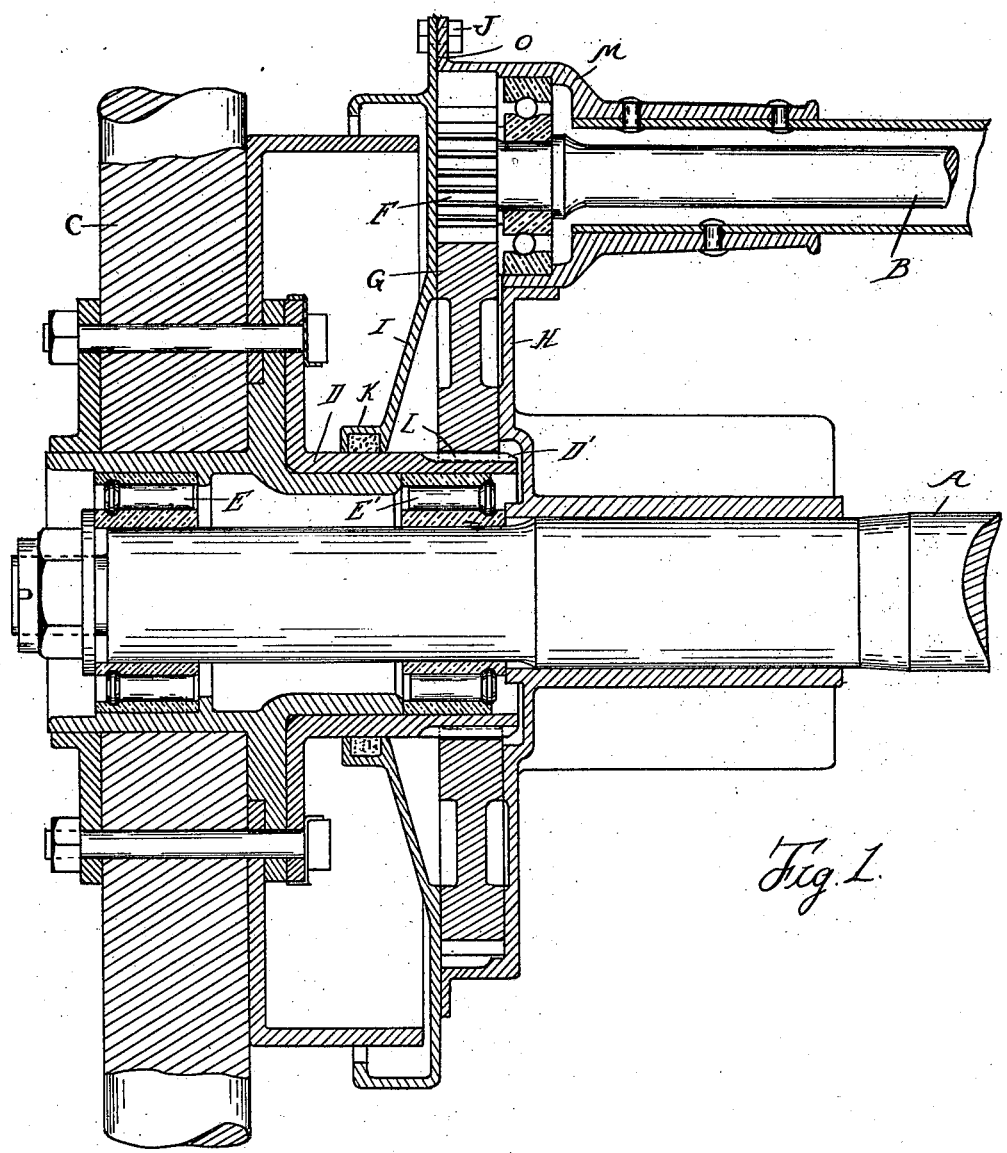
Figure 1 is a longitudinal section through the axle in the plane of the jack-shaft.

In the present state of the art, axles of the type above referred to have been provided with various forms of intermediate driving connection between the jack-shaft and the vehicle wheel. One form commonly used is an internal gear secured to the vehicle wheel and the pinion upon the jack-shaft in mesh therewith. To protect the gearing and to retain the lubricant thereon a suitable housing is provided, but this necessitates the opening of the housing and the draining out of the lubricant whenever it is desired to remove the vehicle wheel. Furthermore, as usually constructed, the hub or mounting for the internal gear is offset from the plane of the teeth so that the driving thrust of the pinion tends to tilt the said internal gear and necessitates a rigid mounting of the same upon the hub of the vehicle wheel. With the present invention the driving connection between the jack-shaft and the vehicle wheel permits of the removal and replacement of said vehicle wheel without disengagement of the driving gears or the opening of the housing in which they are inclosed. Also the construction is such that the gear directly connected with the wheel hub is supported in the plane of the teeth, thereby avoiding any tendency to tilt in one direction or the other. With the construction which is specifically shown, the pinions upon the jack-shaft are in mesh with spur-gears slidably mounted upon and keyed to the wheel hub, and the housing for the gearing is arranged to hold the spur-gear in substantially concentric relation with the axle when the vehicle wheel is removed, so as to facilitate replacement and reëngagement of said wheel.

Another feature of my improved construction is the means employed for mounting the jack-shaft. This comprises a housing containing the journal bearings for said shaft which is laterally separably connected with the housing for the spur-gear and main axle, so that the jack-shaft may be removed with its housing.

In detail, A is the main axle, B is the jack-shaft arranged parallel thereto, and C is the vehicle wheel having a hub portion D and mounted upon suitable roller bearings E and E' on the axle A. F is a pinion upon the jack-shaft, and G is a spur-gear in mesh with said pinion and mounted upon the hub D. H is a housing for inclosing the intermeshing gears, which is mounted upon the axle A and is provided with the removable cover I on the outside of the gears, peripherally secured by clamping bolts J and having a central bearing K upon the hub D. The housing H is so fashioned as to provide a peripheral running clearance for the spur-gear G, but at the same time retain said gear in substantially concentric relation to the axle independent of its mounting upon the hub D. This permits of first inclosing the gears in the housing H and subsequently sliding the hub D into the housing and engaging it with the gear-wheel G. The engagement between the gear-wheel G and hub D is one which will transmit a driving torque, being preferably a spline engagement, as indicated at L.

The housing H on the side adjacent to the jack-shaft B has a segment thereof cut-away, and the jack-shaft is provided with a housing M forming a complementary segment secured to said housing H. As shown, the housings H and M have flanged faces O meeting along a vertical plane, but the cover I of the housing H is extended to embrace both of the housings H and M and to form an additional tie-connection therebetween.

With the construction as shown, in assembling the parts, the gear-wheel G is placed in the housing H and the jack-shaft and pinions F thereon are engaged with the housing M. The housings H and M are then secured to each other with the pinion F and and gear-wheel G in mesh, after which the cover I is placed in position and secured to both housings. The vehicle wheel C may then be slipped upon the bearings E and E' on the shaft A and telescopically engaged with the housing H. The inner end of the hub D is preferably tapered, as indicated at D', which will facilitate entrance in the bore of the gear-wheel G, and as the latter is held in substantially concentric relation by the housing H, engagement between the same and the hub D is easily effected. In use, the driving torque is transmitted from the jack-shaft through the pinion F to the spur-gear G and from the latter through the splines L to the hub D. By reason of the fact that the bearing of the gear-wheel G upon the hub is in the plane of the teeth F there will be no lateral thrust or tendency to tilt the gear-wheel, which permits of a loose fit between said gear and the hub, facilitating removal and replacement. Thus whenever necessary the wheel C may be removed without disturbing the relation of the gear-wheels G and F or opening the housing H, and also if it is necessary to remove the jack-shaft this may be accomplished by simply detaching the housing M from the housing H.

What I claim as my invention is:—

1. The combination with an axle, of a jack-shaft arranged parallel thereto, a vehicle wheel mounted on said axle, a pinion on said jack-shaft, a spur-gear in mesh with said pinion and arranged concentric to said axle, having a driving engagement with said vehicle wheel, a housing on said axle inclosing said gear-wheel, and a housing for said pinion forming a mounting for said jack-shaft, detachably secured to said housing for the gear-wheel.

2. The combination with an axle, of a jack-shaft arranged parallel thereto, a vehicle wheel mounted on said axle, a spur-gear transmission between said jack-shaft and axle, and a housing for said gearing formed in laterally separable sections, permitting detachment and disengagement of said jack-shaft independent of said vehicle wheel.

3. The combination with an axle, of a jack-shaft arranged parallel thereto, a vehicle wheel mounted on said axle, a transmission between said jack-shaft and vehicle wheel including a spur-gear for driving the latter and a pinion in mesh with said gear mounted on said jack-shaft, and a housing for said transmission formed in laterally-separable sections, one of said sections forming a mounting for said jack-shaft and pinion and being disengageable from the other section to permit of disengagement of the jack-shaft and pinion, independent of said spur-gear.

4. The combination with an axle and a jack-shaft arranged parallel thereto, of a vehicle wheel mounted on said axle, a spur-gear for driving said vehicle wheel, a pinion on said jack-shaft in mesh with said spur-gear, a housing on said axle for inclosing said spur-gear having a cut-away segment, a housing for the jack-shaft and pinion forming a complementary segment detachably connected to the housing on the axle, and a removable cover common to both housings and forming a tie connection therebetween.

In testimony whereof I affix my signature.

ALANSON P. BRUSH.